United States Patent
Khafagy et al.

(10) Patent No.: US 9,731,698 B1
(45) Date of Patent: Aug. 15, 2017

(54) SYSTEM AND METHOD FOR CONTROLLING A STOP-START SYSTEM FOR A VEHICLE ENGINE

(71) Applicant: Ford Global Technologies, LLC, Dearborn, MI (US)

(72) Inventors: Hafiz Shafeek Khafagy, Dearborn, MI (US); Chad Everette Griffin, Pinckney, MI (US); Hank L. Kwong, Farmington Hills, MI (US); Ahmed Awadi, Farmington Hills, MI (US); Richard John Hippley, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/094,466

(22) Filed: Apr. 8, 2016

(51) Int. Cl.
*B60W 10/00* (2006.01)
*B60W 10/06* (2006.01)
*B60W 10/18* (2012.01)

(52) U.S. Cl.
CPC .......... *B60W 10/06* (2013.01); *B60W 10/182* (2013.01); *B60W 2510/101* (2013.01); *B60W 2510/18* (2013.01); *B60W 2710/06* (2013.01); *B60W 2710/186* (2013.01)

(58) Field of Classification Search
None
See application file for complete search history.

(56) References Cited

U.S. PATENT DOCUMENTS

| 8,070,648 | B2 | 12/2011 | Soliman et al. |
| 8,690,731 | B1* | 4/2014 | Sangameswaran . F02N 11/0822 477/111 |
| 8,702,563 | B1* | 4/2014 | Sangameswaran ... B60W 10/06 477/111 |
| 8,936,531 | B2 | 1/2015 | Sangameswaran et al. |
| 9,056,606 | B1* | 6/2015 | Rademacher ......... B60W 10/06 |
| 9,291,118 | B2* | 3/2016 | Kokon .................... F02D 29/02 |
| 2015/0275840 | A1 | 10/2015 | Sawada |

* cited by examiner

*Primary Examiner* — Dirk Wright
(74) *Attorney, Agent, or Firm* — David Kelley; Brooks Kushman, P.C.

(57) ABSTRACT

A start-stop vehicle includes an engine configured to automatically stop and start during travel. The vehicle further includes a gear lever, a brake pedal, and a controller. The controller is programmed to restart the engine or inhibit restarting of the engine depending upon one or more sets of conditions of the vehicle. A method is also present for operating the vehicle based upon the one or more sets of conditions.

20 Claims, 3 Drawing Sheets

SYSTEM AND METHOD FOR CONTROLLING A STOP-START SYSTEM FOR A VEHICLE ENGINE

TECHNICAL FIELD

This disclosure relates to a system and method for controlling a stop-start system for a micro-hybrid vehicle.

BACKGROUND

In vehicles with enhanced starter motor technology, for example, micro-hybrid vehicles (also known as mild hybrids), the engine is automatically stopped and restarted by a control system under certain conditions—e.g., when the vehicle is stopped. One type of start-stop system for a vehicle with an automatic transmission is a "Stop-in-Drive" system (SID). In such a system, the engine will only be autostopped when the transmission gear lever is in the "DRIVE" position. The engine is restarted when the gear lever is moved out of DRIVE.

SUMMARY

According to one embodiment, a start-stop vehicle includes an engine configured to automatically stop and start during travel. The vehicle further includes a gear lever, a brake pedal, and a controller. The controller is programmed to, in response to the lever being shifted from DRIVE to NEUTRAL with the engine being autostopped and the brake pedal being released after expiration of a predetermined period that begins with the shift, inhibit automatic restart of the engine.

According to another embodiment, a vehicle includes an engine configured to automatically stop and start during travel. The vehicle further includes a gear selector and a brake pedal in communication with a controller. The gear selector has a lever movable along a mode channel to select a transmission mode. The mode channel includes at least DRIVE, NEUTRAL, REVERSE, and PARK positions. The controller is programmed to automatically stop the engine with the lever in DRIVE, and is programmed to, in response to the lever shifting from DRIVE to PARK with the engine autostopped and remaining in NEUTRAL for less than a first predetermined period that begins with the lever entering NEUTRAL, suppress automatic restarting of the engine. The controller is further programmed to, in response to the lever shifting from DRIVE to PARK with the engine autostopped and remaining in REVERSE for less than a second predetermined period that begins with the lever entering REVERSE, suppress automatic restarting of the engine.

According to yet another embodiment, a method for controlling a start-stop vehicle includes, in response to a lever shift from DRIVE to NEUTRAL with an engine being autostopped and a brake pedal being released after expiration of a predetermined period that begins with the shift, inhibiting automatic restart of the engine. The method further includes, in response to a lever shift from DRIVE to NEUTRAL with the engine being autostopped and the brake pedal being released prior to expiration of the period, automatically restarting the engine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
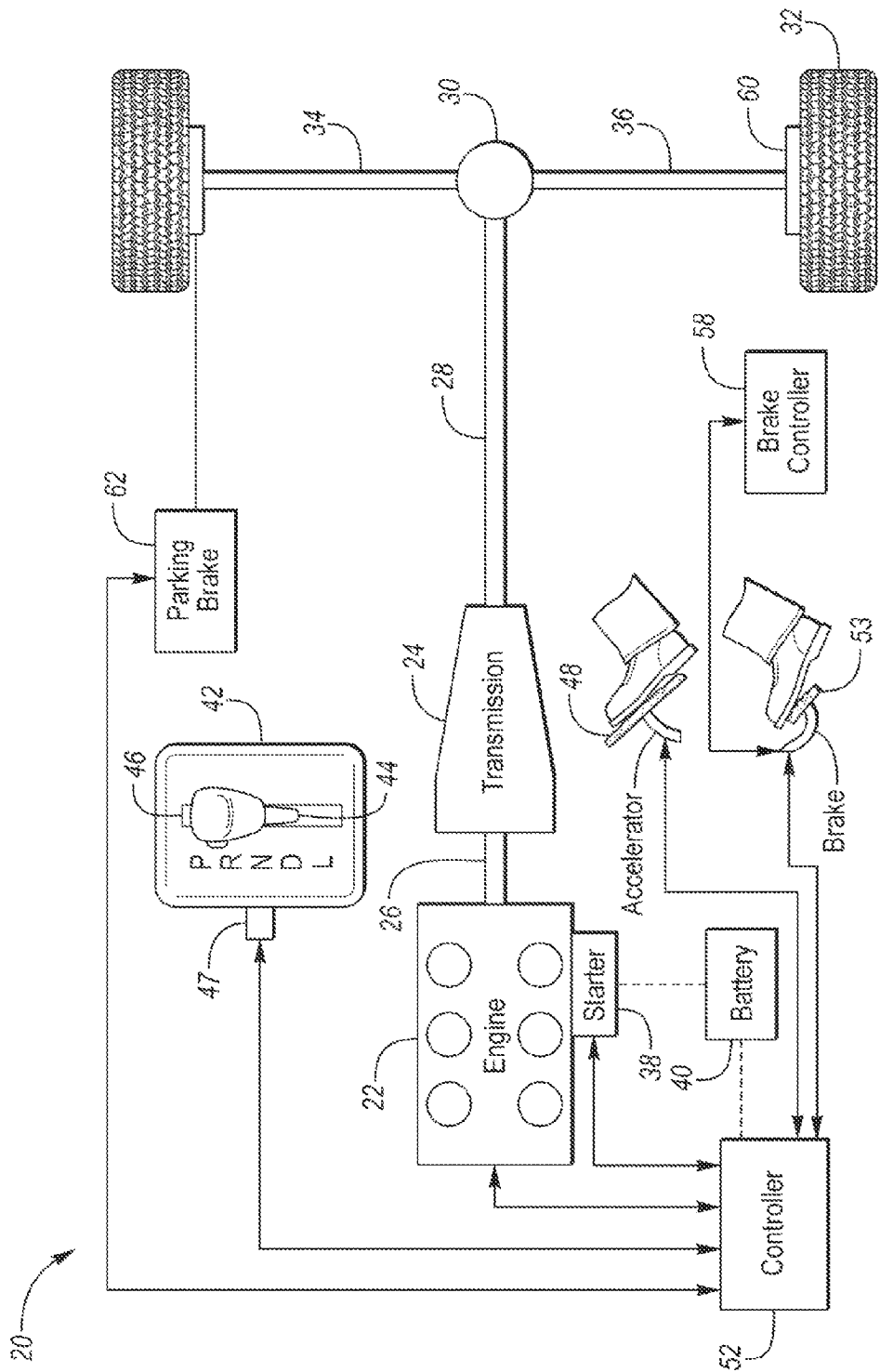
FIG. 1 shows a simplified schematic diagram of a vehicle having a control system in accordance with embodiments of the present invention.

Referring to FIG. 1, a micro-hybrid vehicle 20 (also known as a start-stop vehicle) includes an engine 22 and a transmission 24. A crankshaft of the engine 22 is drivably connected to the transmission input shaft 26 in order to transmit power from the engine to the transmission. The transmission 24 includes an output shaft 28 that is drivably connected to a differential 30. The differential 30 selectively provides power to the driven wheels 32 via one or more axles—such as half shafts 34 and 36. In some embodiments, the differential 30 is disposed within the transmission housing. The vehicle 20 also includes an engine-starter motor 38 that is configured to rotate the crankshaft to turn-over the engine 22 in response to an engine-start signal from the controller 52. The engine-starter motor 38 may be an enhanced starter motor that is specifically designed for the increased duty cycle associated with a micro-hybrid vehicle. The starter 38 is powered by a battery 40, which may be a 12 volt battery or may be a high-voltage battery. In some embodiments, the engine may include a pair of starter motors. A first starter motor may engage a ring gear of the flywheel to turn the engine over. A second motor may connect to the crankshaft pulley by belt, chain, or other means known in the art.

The transmission 24 includes a gear shifter 42 that is moved manually by the driver between at least PARK, REVERSE, NEUTRAL, and DRIVE positions. The gear shifter 42 is linked to the transmission 24 (either electrically and/or mechanically) to place the transmission in the mode selected by the driver. In a typical shifter, a lever 44 rides within a mode channel 46 and the driver slides the lever 44 within the channel 46 to place the lever in the desired position (e.g., DRIVE). The PRND modes may be arranged in series and required to lever to move through one or more of these modes when changing a mode of the transmission. For example, shifting to PARK requires the lever 44 to travel through NEUTRAL and REVERSE. Of course, other types of gear shifters exist such as pushbuttons, column mounted, or turn dials. The gear shifter 42 may include a lever-position sensor 47 configured to send a signal to the controller 52 indicative of the lever 44 position.

An accelerator pedal 48 provides operator input to control a speed of the vehicle 20. The pedal 48 may include a pedal-position sensor 50 that provides a pedal-position signal to the controller 52, which provides control signals to the engine 22.

A brake pedal 53 provides operator input to control the brakes of the vehicle. The brake controller 58 receives operator input through a brake pedal 53, and controls a friction brake system 60, which is operable to apply a braking force to the vehicle wheels 32. The pedal 53 may include a pedal-position sensor 56 that provides a pedal-position signal to the controller 52. The vehicle may include an electric-parking brake 62 that is in communication with the controller 52. The controller 52 is programmed to automatically engage the parking brake 62 when desired.

The controller 52 may be a plurality of controllers that communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers.

As noted above, embodiments of the present invention include a control system for controlling a start-stop system for an engine in a vehicle, such as the engine 22 and the vehicle 20. Such a control system may be embodied by one or more controllers, such as the controller 52. One goal of a vehicle start-stop system is to automatically stop the engine under certain conditions, while restarting it automatically when conditions change. This provides greater fuel economy and reduced emissions.

In some start-stop systems, the engine may be automatically stopped (autostopped) when all of a certain set of conditions are met. For example, if the gear lever is in DRIVE, the brake pedal is pressed, the accelerator pedal is released, and the vehicle speed is close to zero, the engine 22 may be automatically stopped. Another condition that may be included in this set of conditions is that none of the vehicle subsystems (e.g., air conditioning or power steering) require the engine to be running. In a start-stop system where all conditions are required to be met before the engine is autostopped, not only will the start-stop system inhibit the engine from being automatically stopped if any of the conditions in the set are not met, but once having been autostopped, the engine may be automatically restarted if any of the conditions change.

Continuing then with the example from above, if the engine has been autostopped while the vehicle is in DRIVE, the engine may be automatically restarted if the operator shifts out of DRIVE and certain conditions are met. This restarting may be undesirable, particularly if the operator intends to place a vehicle in PARK, and shut the engine Off, or if the operator intends to place the vehicle in NEUTRAL and remained stopped. Therefore, in at least some embodiments of the present invention, the controller 52 is configured to account for these different requirements. For example, when the engine 22 has been autostopped with the vehicle in DRIVE, and the gear lever 44 of the transmission 24 is shifted out of DRIVE, the controller 52 is configured to automatically restart the engine 22 under at least one condition, and to inhibit automatic restarting the engine 22 under at least one other condition.

Figure 2A:
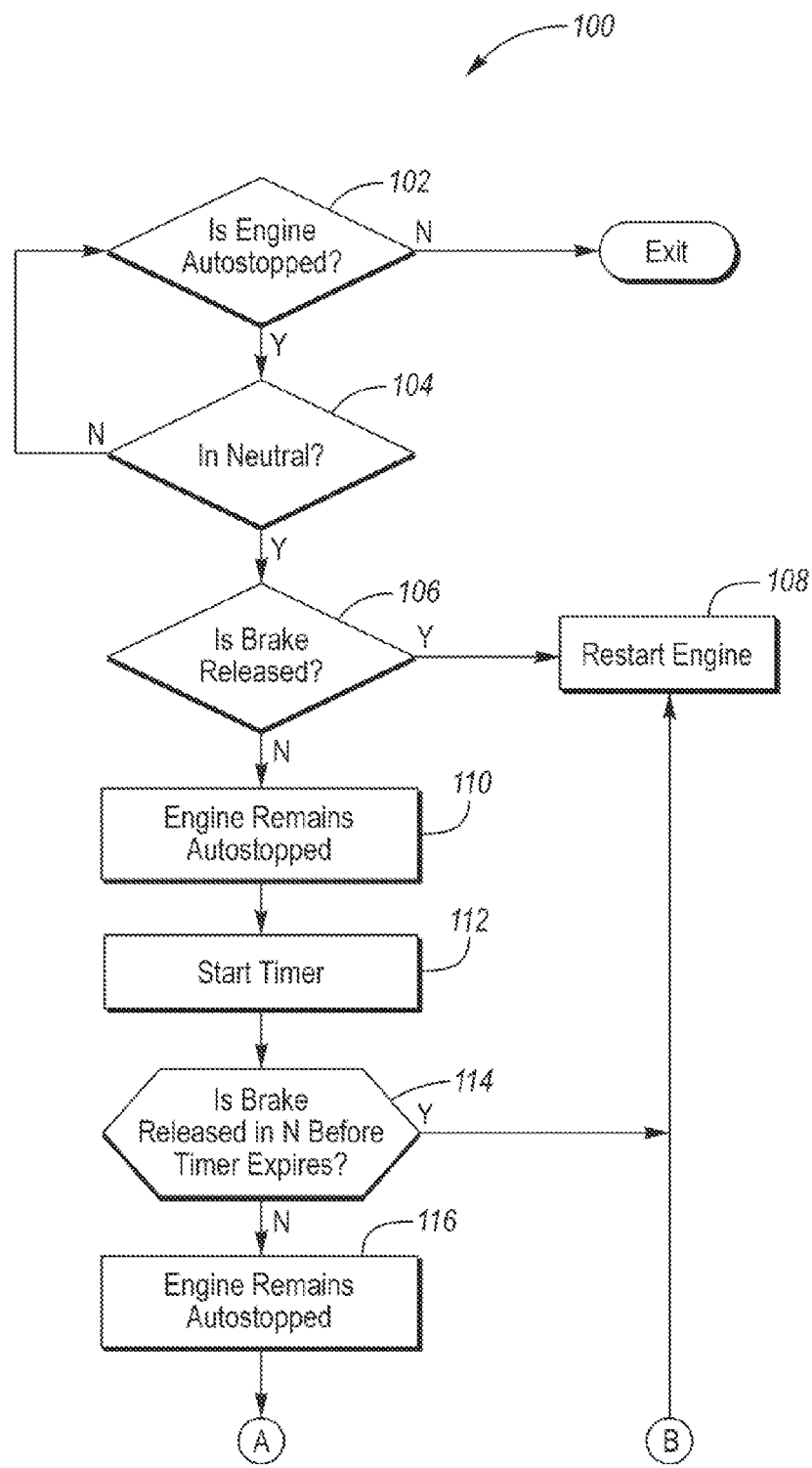
FIGS. 2A and 2B are a flow chart illustrating a method of controlling a start-stop vehicle in accordance with embodiments of the present invention.
Figure 2B:
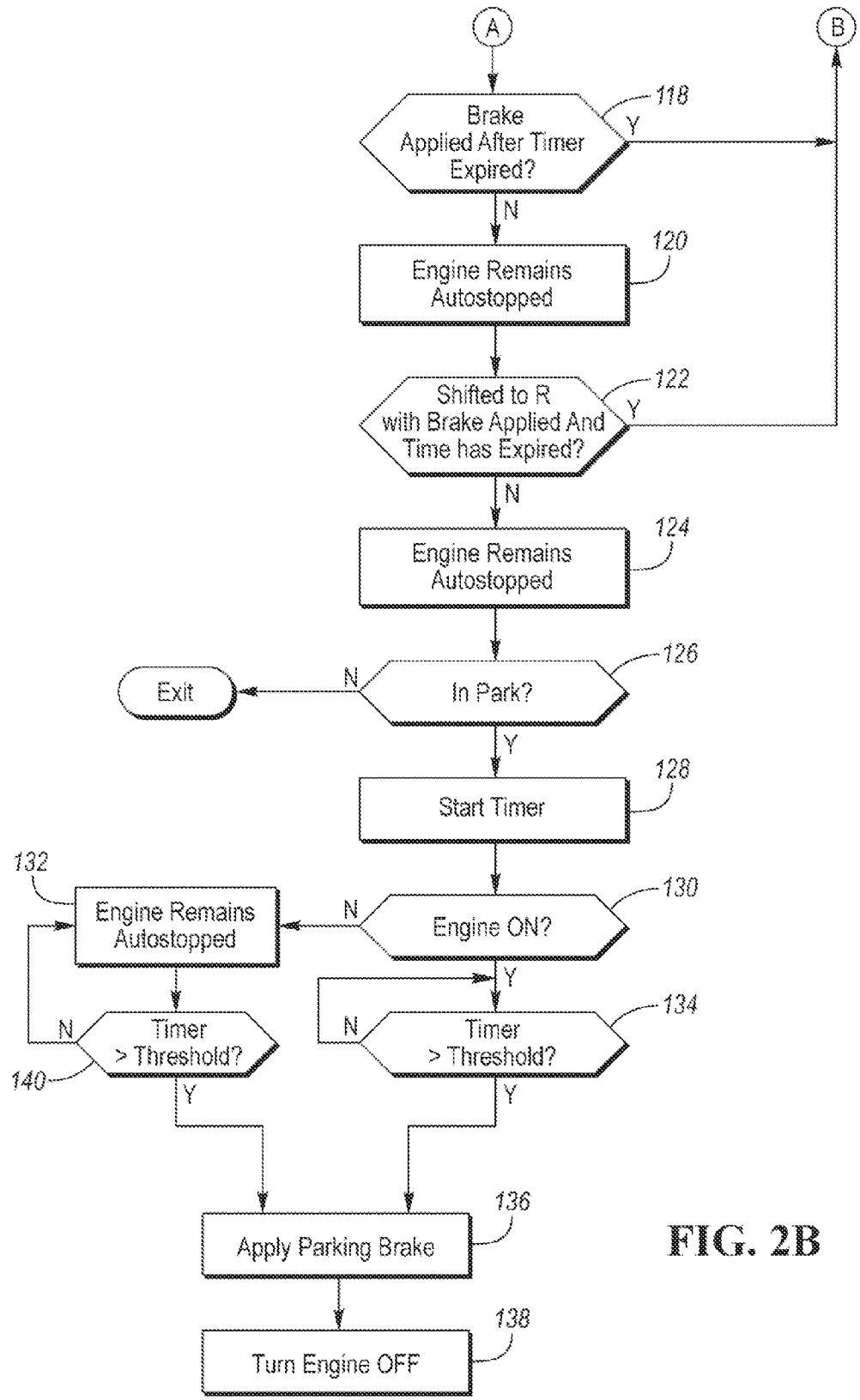

Control logic or functions performed by the controller 52 may be represented by flow charts or similar diagrams, such as the flow chart 100 in FIG. 2. FIG. 2 provides a representative control strategy and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 52. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices that utilize electric, magnetic, and/or optical storage to keep executable instructions and associated calibration information, operating variables, and the like.

FIG. 2 illustrates a flow chart of an example algorithm 100 for implementing a control strategy according to one embodiment. The control strategy occurs when the engine is automatically stopped while the vehicle is on and being driven. The algorithm begins by determining if the engine is autostopped in DRIVE at operation 102. The engine will remain autostopped in drive until a triggering condition occurs. The condition may be driver induced such as the driver shifting from drive into a different transmission mode, or may be system induced. For example, the engine may be restarted if the battery state of charge drops below a threshold or if the climate-control system requires the engine to be running. At operation 104 the controller determines if the gear lever is in the NEUTRAL position. If no, control passes back to operation 102. Upon shifting into NEUTRAL, the controller immediately determines if the brake is unapplied at operation 106. If yes, the controller instruct the starter motor to restart the engine at operation 108. If no, the engine remains autostopped at operation 110 and a timer is started at operation 112. The timer is used to differentiate between a driver shifting to NEUTRAL as opposed to a driver shifting through NEUTRAL on the way to REVERSE or PARK for example. This time is known as the debouncing time and may be set at 100 milliseconds (ms). Of course, the time may be increased or decreased depending upon the design. At operation 114 the controller determines if the brake was released in NEUTRAL before the timer expires. If yes, the engine is restarted. If no, the engine remains autostopped at operation 116. At operation 118 the controller determines if the brake was applied in NEUTRAL after the timer expired. If yes, the engine is restarted at operation 108. If no, the engine remains autostopped at operation 120.

At operation 122 the controller determines if the gear lever is shifted to REVERSE with the brake applied and the debouncing time has expired. If yes, control passes operation 108 and the engine is restarted. If no, the engine remains autostopped at operation 124.

In operation 126 the controller determines if the gear selector is in PARK. If the vehicle is not in PARK this algorithm is exited. If the vehicle is in PARK a debouncing timer is started at operation 128. At operation 130 the controller determines if the engine is ON. If no, the engine remains auto stopped at operation 132. If yes, control passes to operation 134 and the controller determines if the debouncing time has expired. If yes control passes operation 136 in the engine is turned OFF. When the engine is turned OFF, as opposed to autostopped, a key turn (or button push) is required to restart the engine. Used herein "autostopping" and "engine OFF" are two separate modes. In autostopping the engine is turned OFF but may be automatically restarted by the vehicle. In contrast, "engine OFF" means that engine is turned OFF and will not automatically restart. The driver must perform a manual ignition sequence (e.g., turning the key or pressing the start button) to restart the engine from OFF. If the timer is not expired, the algorithm loops until the transmission is shifted out of Park or the timer expires. After the engine is turned OFF in operation 136, the electronic parking brake may be engaged at operation 138. After the engine is autostopped at 132, a debouncing timer is started at operation 140 once the timer expires, control passes to operation 136 and the engine is turned OFF.

Embodiments of the present invention also provide a control system and method for automatically restarting an engine, such as the engine 22, when it has been autostopped with the vehicle in PARK. In at least one embodiment, the engine 22 is autostopped while the vehicle is in PARK. If the gear lever 44 is moved out of PARK prior to expiration of the park timer, the engine 22 is automatically restarted. The engine 12 may also be automatically restarted after it has been autostopped while the vehicle is in PARK if the timer has not expired, and at least one vehicle subsystem requires the engine 22 to be running in order to maintain functionality of the subsystem. For example, electrical subsystems that have high-power requirements, such as an air-conditioning system, may cause an automatic restart the engine 22 even if the vehicle is in PARK. Another condition that may cause an automatic restarting of the engine 22 after it has been autostopped with the vehicle in PARK, is the accelerator pedal being pressed. Thus, in addition to providing flexibility in a start-stop system that autostops the engine when the vehicle is in DRIVE, the aforementioned method provides a "Stop-in-Park" system that may provide even greater fuel economy and emissions reduction.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method comprising:
   in response to a lever shift from DRIVE to NEUTRAL with an engine being autostopped and a brake pedal being released after expiration of a predetermined period that begins with the shift, inhibiting automatic restart of the engine; and
   in response to a lever shift from DRIVE to NEUTRAL with the engine being autostopped and the brake pedal being released prior to expiration of the period, automatically restarting the engine.

2. The method of claim 1 further comprising:
   in response to a lever shift to PARK with the engine running and the lever remaining in PARK for a predetermined period, turning the engine OFF.

3. The method of claim 2 further comprising, in response to the engine being turned OFF, applying an electronic-parking brake.

4. The method of claim 1 further comprising, in response to a lever shift to PARK with the engine being autostopped and the lever remaining in PARK for less than a predetermined period, inhibiting automatic restart of the engine.

5. The method of claim 1 further comprising, in response to a lever shift to PARK with the engine being autostopped and the lever remaining in PARK for a predetermined period, turning the engine OFF.

6. The method of claim 1 further comprising, in response to a lever shift from NEUTRAL to REVERSE with the engine being autostopped and the brake pedal being applied after expiration of a predetermined period that begins with the shift from NEUTRAL to REVERSE, automatically restarting the engine.

7. A start-stop vehicle comprising:
   an engine configured to automatically stop and start during travel;
   a gear lever;
   a brake pedal; and
   a controller programmed to, in response to the lever being shifted from DRIVE to NEUTRAL with the engine being autostopped and the brake pedal being released after expiration of a predetermined period that begins with the shift, inhibit automatic restart of the engine.

8. The vehicle of claim 7 wherein the controller is further programmed to, in response to shifting the lever from DRIVE to NEUTRAL with the engine being autostopped and the brake pedal being released prior to expiration of the period, automatically restart the engine.

9. The vehicle of claim 8 wherein the engine further includes a belt-driven starter configured to start the engine when actuated, and wherein the controller is further programmed to send a START command to the starter to automatically restart the engine.

10. The vehicle of claim 7 wherein the controller is further programmed to, in response to the lever being shifted to PARK with the engine running and the lever remaining in PARK for a predetermined period, turn the engine OFF.

11. The vehicle of claim 10 further comprising an electric-parking brake, wherein the controller is further programmed to, in response to the engine being turned OFF, apply the electric-parking brake.

12. The vehicle of claim 7 wherein the controller is further programmed to, in response to the lever being shifted to PARK with the engine being autostopped and the lever remaining in PARK for less than a predetermined period, inhibit automatic restart of the engine.

13. The vehicle of claim 7 wherein the controller is further programmed to, in response to the lever being shifted to PARK with the engine being autostopped and the lever remaining in PARK for a predetermined period, turn the engine OFF.

14. The vehicle of claim 7 wherein the controller is further programmed to, in response to the lever being shifted from NEUTRAL to REVERSE with the engine being autostopped and the brake pedal being applied after expiration of a predetermined period that begins when the lever enters REVERSE, automatically restart the engine.

15. A vehicle comprising:
   an engine configured to automatically stop and start during travel;
   a gear selector including a lever movable along a mode channel to select a transmission mode, wherein the mode channel includes DRIVE, NEUTRAL, REVERSE, and PARK positions;
   a brake pedal; and
   a controller programmed to,
      automatically stop the engine with the lever in DRIVE,
      in response to the lever shifting from DRIVE to PARK with the engine autostopped and remaining in NEUTRAL for less than a first predetermined period that begins with the lever entering NEUTRAL, suppress automatic restarting of the engine, and
      in response to the lever shifting from DRIVE to PARK with the engine autostopped and remaining in REVERSE for less than a second predetermined period that begins with the lever entering REVERSE, suppress automatic restarting of the engine.

16. The vehicle of claim 15 wherein the controller is further programmed to, in response to the brake pedal being applied while the lever is in NEUTRAL and the first predetermined period not being expired, automatically restart the engine.

17. The vehicle of claim 15 wherein the controller is further programmed to, in response to the lever being in PARK for greater than a third predetermined period that begins with the lever entering PARK, turn the engine OFF.

18. The vehicle of claim 17 wherein the controller is further programmed to, apply an electric-parking brake in response to the engine being turned OFF.

19. The vehicle of claim 15 wherein the controller is further programmed to, in response to the brake pedal being applied while the lever is in REVERSE and the second predetermined period being expired, automatically restart the engine.

20. The vehicle of claim 15 wherein the gear selector further comprises a lever-position sensor configured to output a lever-position signal to the controller.

* * * * *